United States Patent [19]

Vogt et al.

[11] 4,063,458
[45] Dec. 20, 1977

[54] METHOD AND APPARATUS FOR OPERATING INSTRUMENTS SUBJECT TO RADIATION

[75] Inventors: Hans-Wilhelm Vogt, Cologne; Gerd Frogermann, Solingen, both of Germany

[73] Assignee: Klockner Humboldt Deutz Aktiengesellschaft, Germany

[21] Appl. No.: 709,241

[22] Filed: July 27, 1976

[51] Int. Cl.$^2$ .......................... G01J 5/02; G01K 1/12
[52] U.S. Cl. .............................. 73/355 R; 73/343 R; 250/352
[58] Field of Search ............... 73/15 R, 343 R, 355 R; 236/1 F, DIG. 15; 250/352, 515; 340/239 R, 240, 243

[56] References Cited

U.S. PATENT DOCUMENTS

| | | | |
|---|---|---|---|
| 1,967,018 | 7/1934 | Bohner | 340/239 X |
| 3,024,344 | 3/1962 | Dills | 73/343 R X |
| 3,160,009 | 12/1964 | Carney | 73/355 R |
| 3,226,505 | 12/1965 | Lucas et al. | 340/239 R X |
| 3,436,965 | 4/1969 | Land | 73/355 R |

Primary Examiner—Richard C. Queisser
Assistant Examiner—John S. Appleman
Attorney, Agent, or Firm—Hill, Gross, Simpson, Van Santen, Steadman, Chiara & Simpson

[57] ABSTRACT

The invention relates to a method for the operation of an instrument subjected to a radiation, which is protected from the harmful influence of the radiation by means of an auxiliary medium and/or swinging in of a protective shield between source of radiation and instrument.

The invention relates further to an apparatus for carrying out this method.

8 Claims, 4 Drawing Figures

METHOD AND APPARATUS FOR OPERATING INSTRUMENTS SUBJECT TO RADIATION

The control- and regulating-technique with the necessity of a control of different operational points over wide distances, whose results, as the case may be, are transferred in a central control room to a control desk or console, makes necessary the introduction of observation instruments. If it is a question, for example of the supervision of a combustion chamber or the control of a highly tempered melting bath with respect to the temperature or the surface, then for example the introduction of radiation-pyrometers and/or television cameras is a measure in keeping with the purposes for this type of remote control.

A difficulty with the introduction of such instruments exists insofar, as the latter are sensitive with respect to the radiation of the supervised objects, for example, long-wave heat radiation. Additionally, such instruments, which among other things may also be equipped with a sensitive optical system and electronic structural elements, are also open to soiling be it through spraying metal parts, rust, dust, oil-fumes or the like.

It is the state of the art to protect such instruments occasionally by means of a cooling watersleeve or by means of shielding with the aid of air-fog for such harmful effects of a radiation or soiling occasioned by environmental conditions. It was further already suggested to swing out or to remove the instruments before and after the installation by means of a transporting or pivoting device from the dangerous area. Such devices indeed fulfill their purpose, however, have the diadavantage that for their actuation te attention of an attendant is necessary, and that furthermore a certain time is required in order to remove the device or bring it into position again, whereby under certain circumstances also the assuming of an exact position in the supervisional field is changed, so that occasionally post-adjustments become necessary.

For these reasons, there often exists an urgent need for as economical and uncomplicated a solution as possible for the protection of an instrument subject to a source of radiation.

The problem put hereby is solved with the invention hereby, that at least the swinging in of the protective shield is undertaken automatically in dependence upon a control parameter of the auxiliary medium.

In a purposeful embodiment of this method, furthermore, use may be made of the measure, that both the swinging in as well as also the swinging away of the protective shield is undertaken in dependence upon a conditional amount of the auxiliary medium.

According to the position of things in each case, in the case of the method, the start is with the fact that the auxiliary medium is a liquid, a gas or an electric energy.

As a control parameter of one or more of these media, may be advanced a temperature, a pressure, a weight, an electric voltage or even an electric current density.

An apparatus for carrying out the method is characterized by a heat-shield in movable arrangement, which under the influence of a force stretches in a position between source of radiation and instrument, and upon overcoming this force is brought inot a position outside of the field of radiation between source of radiation and instrument, and there is held fast by means of an arresting apparatus, as well as by means of a release mechanism for this arresting apparatus, on which acts a control parameter of at least one auxiliary medium in such manner, that an alteration of this control parameter brings about the release.

With such an apparatus, the force may be a spring-force, however, the force of gravity of the earth may also be made use of.

In a suitable embodiment of the apparatus, according to the invention, use may be made of the measure that for overcoming the force, a servomotor is provided.

A particularly purposeful embodiment of the apparatus results also thereby that the servomotor at the same time also carries out the function of the arresting apparatus. This may for example be realized according to the type and manner that an operating cylinder acted on by the auxiliary medium takes over in common both the function of the servomotor as well as also the function of the arresting apparatus.

Another, likewise purposeful variation of the functional embodiment of an apparatus according to the invention may be characterized thereby, that the arresting apparatus has a locking latch, which cooperates with a spring and a pressure diaphragm in such manner, that the spring force upon low pressure of the auxiliary medium acting on the diaphragm while overcoming the force of this diaphragm, moves back the locking latch and thereby releases the arresting apparatus, while upon higher pressure of the auxiliary medium, the force of the diaphragm slides forward the locking latch while overcoming the springforce, into the arresting position.

There may, however, also be provided as arresting appratus and release mechanism, a holding magnet energizable by means of electric energy, which upon being subjected to this electric energy releases the heat-shield.

The release mechanism, may however, also respond to a weight-difference, which results from a pipemember flowed through by the liquid auxiliary medium, said pipe member emptying upon being subjected to in-flows and thereby experiencing an alleviation in weight.

And finally, the heat shield in type and manner known per se, may consist of two radiation-repellent plates, arranged at a spacing and releasing an air gap between them, whereby the plates continously give off heat and are cooled thereby.

The method according to the invention as well as a selected number of apparatus, which are imaginable, in order to carry out this method, will be explained in greater detail in the following on the basis of several figures.

Figure 1:
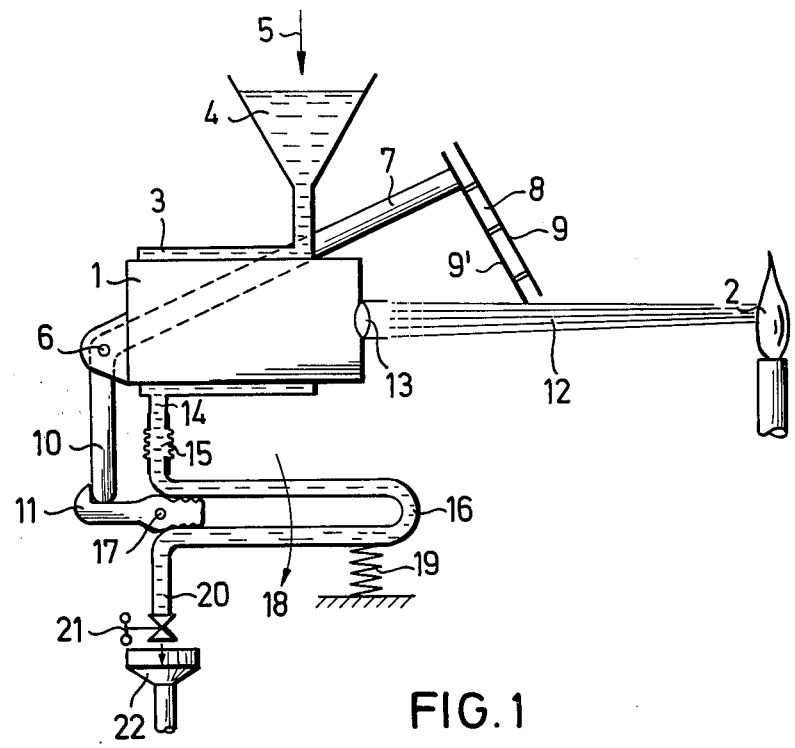
FIG. 1 shows the function-diagram of an apparatus in which the swinging-in of the protective shield is released through a cooling liquid.

In FIG. 1 is seen a television camera 1, which observes or supervises the symbolically shown radiation-source 2. The camera 1 possesses for cooling a sleeve 3 flowed through by cooling water, in which the cooling water is introduced through the feed pipe 4, as indicated by the arrow 5. The radiation-protective-shield 8 is held with the camera 1 pivotable or swingable at the point of rotation 6 with the arm 7, said shield consisting of the two plates 9, 9'. The holding arm 7 possesses an arresting-continuation 10 which is held tight by a locking latch 11, so that the heat shield 8 is located outside of the field of radiation 12 between the optical system 13 of the instrument 1 and the source of radiation 2. With the runoff 14 of the water-sleeve 3 is hingedly connected by means of a rubber collar 15, a U-pipe 16, which is fixedly connected with the locking latch 11 and may be pivoted in common with the same about the point of rotation 17. In the filled condition of the U-pipe 16, the weight of the water filling brings about a rotary movement in the direction of the arrow 18, which opposes the force of the spring 19. There is found further in the runoff 20 of the U-pipe 16 the control cock 21, which insures adjustment of the quantity of cooling water which is conveyed off in the run-off 22.

The function of the apparatus shown is imaginably simple. The protective shield 8 for the operating condition of the camera 1 in a way and manner not shown in greater detail — by hand or by means of a motor — is brought into the swung-out position shown, and is arrested there by means of engagement or locking of the locking latch 11 with the arresting continuation 10. The cooling water 5 is thereby turned on, it fills the water-sleeve 3 and the U-pipe 16, whereby on account of its overweight, the latter is pressed downward in direction of the arrow 18, in that it overcomes the lesser force of the spring 19. In this way, the locking latch 11 holds tight the arresting continuation 10, so that the shield 8 remains in the swung-out position shown. As soon, however, as the feed 5 of the cooling water discontinues, the U-pipe 16 empties, the force of the spring 19 may overcome the weight of the U-pipe 16, the spring presses the U-pipe upward, the locking latch 11 unlocks from the arresting continuation 10 and the heat-shield 8 drops through its own weight down and disposes itself protectingly between source of radiation 2 and optical system 13 of the instrument 1.

Figure 2:
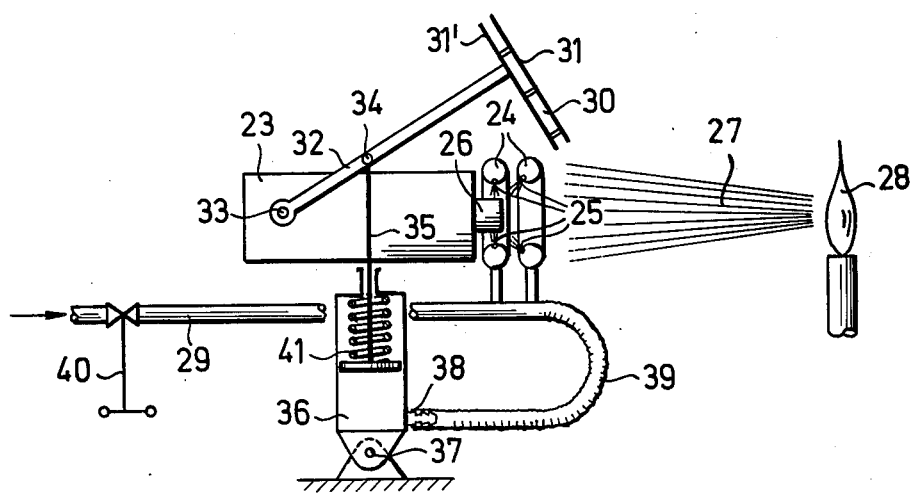
FIG. 2 shows the function-diagram of another apparatus, in which both the swinging-in as well as also the swinging-out of the protective shield is carried out fully automatically in dependence on the pressure of a cooling air-feed.

In FIG. 2 is to be seen another instrument 23 which by means of an arrangement of cooling-air-inlets 24 with the cooling-air-nozzles 25 which spread out about the optical system 26 of the instrument 23 a fog or mist of cooling air, — is protected from the harmful effect of the field of radiation 27 of the source of radiation 28. The cooling-air-inlets 24 are attached to an air-feed conduit 29. Furthermore there is seen the heat-shield 30, consisting of the two plates 31, 31', arranged at a spacing. The heat-shield is carried by an arm 32, which is rotatably positioned at the hinged point 33. This arm 32 is rotatably connected by means of the joint 34 with the piston rod 35 of an operating cylinder. The operating cylinder 36, on its part, is positioned oppositely at the point of rotation 37 and connected with the pressure pipes 38 by means of a movable hose 39 with the compressed air feed 29.

The function also of this apparatus is relatively simple and easily supervisable. If with the aid of the control cock 40 the path of the compressed air in the supply conduit 29 is released, then this conduit fills, and driven by the pressure of the air, there results in front of the optical system 26 of the instrument 23, the fog or mist of air issuing from the nozzles 25, said fog flowing protectively about the instrument. At the same time, however, the compressed air passes through the hose 39 and the pressure pipes 38 into the interior of the pneumatic operating piston 36, whereby the piston rod 35 moves upwardly against the force of the return spring 41. This movement transfers through the joint 34 to the arm 32, which lifts the heat shield 30 out of the connecting line between the source of radiation 28 and the optical system 26. Thereby the possibility is given to the instrument 23 for observation or supervision of the source of radiation 28. If, however, the pressure of the cooling air is abated for some unforeseen reason, the force of the spring 41 would overcome the lifting power of the piston 36 and let the heat shield 30 slide down into the swung-in position, whereby the instrument is protected from the radiation.

Figure 3:
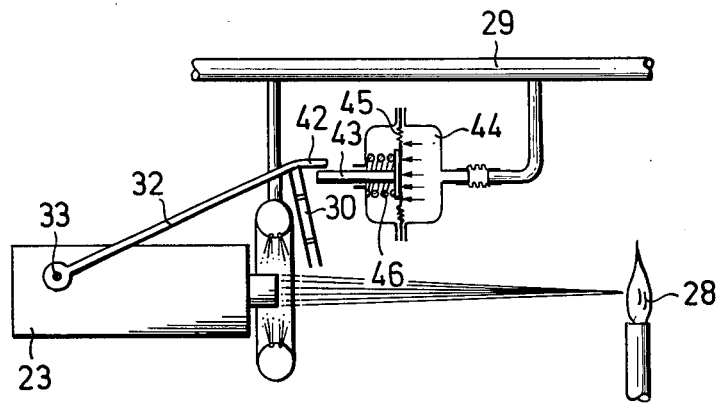
FIG. 3 shows a function diagram, in which the release of the protective shield takes place in dependence upon the pressure of a cooling air-feed.

FIG. 3 shows a similar construction of the apparatus, whereby the heat-shield 30 is fixed to arm 32 and likewise is arranged swingably about a point of rotation 33 hingedly on the body of the instrument 23.

In the example shown, the arm 32 possesses an arresting continuation 42. The latter is held by the locking pin 43 of a release mechanism 44 with the movable diaphragm 45 through the pressure of the air against the force of a spring 46, as long as in the feed conduit 29 a sufficient air pressure is present.

As soon, however, as the air pressure abates, the condition is attained at which the return spring 46 overcomes the force of the diaphragm 45. Then the locking pin 32 snaps back and releases the arresting continuation 42, so that the heat-shield under the effect of the force of gravity drops into the swung-in position between the source of radiation 28 and the instrument 23.

Figure 4:
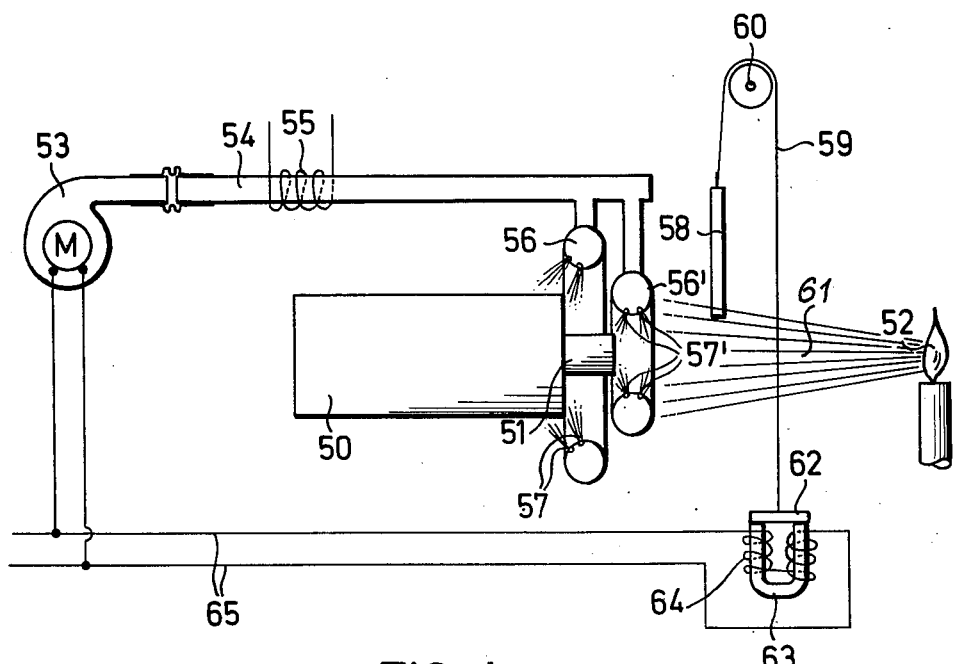
FIG. 4 shows another apparatus in diagram, in which the swinging-in of the protective shield takes place in dependence upon an electric energy.

From the great number of possible alternatives of the apparatus for carrying out the method according to the invention, there is selected and shown in FIG. 4 a further variation. A radiation-pyrometer 50 observes with its optical system 51 a source of radiation 52. For the protection of the instrument and its optical system, a fog of air is maintained erect thereby that a blower motor M which is in connection with a blower 53 feeds air, which is cooled in the pipe 54 through the heat exchanger 55 and is fed into the ring-conduits 56, 56'. These ring- or annular-conduits 56, 56' possess air nozzles 57, 57', which spread out the fog of air about the instrument 50. The heat-shield 58, in the function-diagram shown in side view from the narrow side, is lifted out on a holding cord 59 over a roll 60 out of the radiation field 61 between source of radiation 52 and optical system 51, and in this position is held tight by means of the armature 62 which is held tight by the magnet 63 under the effect of the magnetic forces produced by the energizer coils 64, until the electric energy which is fed with the aid of the conduit 65 is present, or rather, as long as it is present, and thereby maintains in motion the motor M of the blower 53. Upon loss of the electric energy, the conduits 65 become without current. The motor M of the blower 53 comes to a standstill, the cooling-air-fog breaks up. At the same time, the magnet 63 releases the armature 62, and the heat shield 58 moves under the force of its own weight downward and lays itself protectingly in the field of radiation 61 between the optical system 51 and the source of radiation 52.

All examples of apparatus according to the invention shown in the four Figures are only purely functional disclosures for a plurality of constructive possibilities for variations of the apparatus, which are all adapted for carrying out the inventive method. Further alternatives of such and similar arrangements are to be imagined and permit of being combined out of the examples shown.

For example, instead of heat rays, also X-rays, intensive light such as sun-light or laser-rays come into consideration, among others. A shield for the protection of the device may consist of metal, plate-glass or mirror-glass, quartz, among others.

All such apparatus come under the invention, if they satisfy one of the following claims.

We claim:

1. An apparatus for protecting an instrument subject to radiation against excessive radiation which comprises a radiation shield movable into a radiation shielding position between the radiation source and said instrument, spring means holding said radiation shield in radiation shielding position, holding means for holding said radiation shield out of said radiation shielding position, a release means operable to deactuate said holding means and thereby bring said radiation shield into said radiation shielding position, cooling means for cooling said instrument and sensor means associated with said cooling means and arranged to operate said release means upon change in the output of said cooling means.

2. The method of protecting a radiation sensitive instrument against excessive radiation which comprises a positioning a protective shield for movement into and out of radiation shielding position with respect to said instrument, directing a fluid coolant at said instrument during such radiation, said fluid coolant being circulated by an electrically energized power source, and positioning said protective shield into radiation shielding position in response to a predetermined decrease in the electrical energization of said power source.

3. An apparatus for protecting an instrument subject to radiation against excessive radiation which comprises a radiation shield movable into a radiation shielding position between the radiation source and said instrument, means including a servo motor holding said radiation shield in radiation shielding position, holding means for holding said radiation shield out of said radiation shielding position, a release means operable to deactuate said holding means and thereby actuate said servo motor to bring said radiation shield into radiation shielding position, cooling means for cooling said instrument and sensor means associated with said cooling means and arranged to operate said release means upon change in the output of said cooling means.

4. An apparatus for the protection of a measuring instrument subject to excessive radiation which comprises a protective shield, positioning means for moving said protective shield into and out of a radiation shielding location with respect to said instrument, coolant circulating means for circulating a fluid coolant in proximity to said instrument, and means actuated by a decrease in the flow of said coolant to operate said positioning means to insert said protective shield into said radiation shielding position.

5. An apparatus according to claim 4 in which said positioning means includes a locking mechanism, a conduit through which said coolant circulates, and said means for operating said positioning means being operable upon a decrease in weight of the coolant in said conduit to release said locking mechanism and position said shield in radiation shielding position.

6. An apparatus according to claim 4 wherein said means for operating said positioning means includes a diaphragm, spring means acting to displace said diaphragm in one direction, means for directing fluid coolant against said diaphragm to displace said diaphragm in the opposite direction, and means coupling said diaphragm to said positioning means.

7. An apparatus according to claim 4 wherein said means for operating said positioning means includes a cylinder, a piston reciprocable in said cylinder, spring means urging said piston in one direction, means for introducing a portion of said fluid coolant into said cylinder so that its fluid pressure acts on said piston in opposition to said spring means, and means coupling said piston to said positioning means.

8. An apparatus according to claim 4 in which said protective shield consists of two spaced plates separated by an air gap.

* * * * *